United States Patent [19]

Nowak

[11] Patent Number: 4,610,159
[45] Date of Patent: Sep. 9, 1986

[54] SELF-PROPELLED VEHICLE POWER TRAIN EVALUATION

[75] Inventor: David Nowak, Dunstable, Mass.
[73] Assignee: RCA Corporation, Princeton, N.J.
[21] Appl. No.: 685,992
[22] Filed: Dec. 24, 1984
[51] Int. Cl.[4] ................................................ G01L 5/13
[52] U.S. Cl. ...................................................... 73/116
[58] Field of Search ................. 73/116, 862, 128, 117, 73/117.3; 364/551

[56] References Cited

U.S. PATENT DOCUMENTS

| | | | |
|---|---|---|---|
| 3,287,965 | 11/1966 | Brahm et al. | 73/117.3 |
| 3,657,922 | 4/1972 | Sibeud | 73/862 |
| 3,750,465 | 8/1973 | Howell et al. | 364/551 |
| 3,960,011 | 6/1976 | Renz et al. | 73/116 |
| 3,994,160 | 11/1976 | Hanson | 73/116 |
| 4,080,654 | 3/1978 | Walley, Jr. | 365/551 |
| 4,228,681 | 10/1980 | Pruex | 73/862 |
| 4,441,359 | 4/1984 | Ezoe | 364/551 |

FOREIGN PATENT DOCUMENTS 10121 1/1983 Japan ................................ 73/116

Primary Examiner—Stewart J. Levy
Assistant Examiner—Robert R. Raevis
Attorney, Agent, or Firm—Joseph S. Tripoli; Robert L. Troike; Raymond E. Smiley

[57] ABSTRACT

A self-propelled vehicle power train evaluation method employing a speed measuring radar directed toward a vehicle under test includes the steps of accelerating the vehicle toward the radar at full acceleration until a given speed is reached and recording the resulting speed versus time signal, optionally accelerating the vehicle away from the radar to thus produce an average speed versus time signal and comparing the thus produced speed versus time signal with a signal representing a standard vehicle of the type under test.

5 Claims, 4 Drawing Figures

SELF-PROPELLED VEHICLE POWER TRAIN EVALUATION

BACKGROUND OF THE INVENTION

1. Field of Invention

This invention is concerned with dynamic evaluation of a self-propelled vehicle drive train and more particularly with a non-contact vehicle drive train evaluation.

2. Description of the Prior Art

Dynamometers for measuring vehicle drive train performance have been available for years. The vehicle to be tested is driven onto the dynamometer with its drive wheels resting on the dynamometer rollers. Then the vehicle is accelerated and subsequently decelerated while certain tests are performed.

Dynamometers suffer from several problems. The dynamometer is very costly. It must be mounted in a fixed location. Dynamometers other than for cars and light trucks are not generally available. Thus it has been heretofore not possible to test the drive train of a large vehicle such as a truck, construction vehicle or track vehicle in a field location except by using mobile research dynamometers which are power absorbing devices permanently installed on a dedicated vehicle. The dedicated vehicle is towed by the vehicle under test. Such dedicated vehicles are exceedingly costly.

SUMMARY OF THE INVENTION

In accordance with a preferred embodiment of the present invention a method of testing vehicle drive trains utilizing a speed measuring radar and a means storing a speed versus time waveform for a "standard" vehicle of the type being tested comprises the steps of: (1) accelerating the vehicle under test at full acceleration on level ground toward (or) away from the speed measuring apparatus to a preselected speed, (2) recording the resulting radar produced signal representing speed versus time, (3) recording a signal indicating the weight of the vehicle under test, (4) compensating the signal representing the speed versus time of the vehicle under tests for the difference in weight between the vehicle under test and the "standard" vehicle, (5) comparing the compensated signal against the signal representing the "standard" vehicle and (6) producing a warning signal if the compensated signal and standard vehicle signal differ by more than a preselected amount.

DETAILED DESCRIPTION

Figure 1:
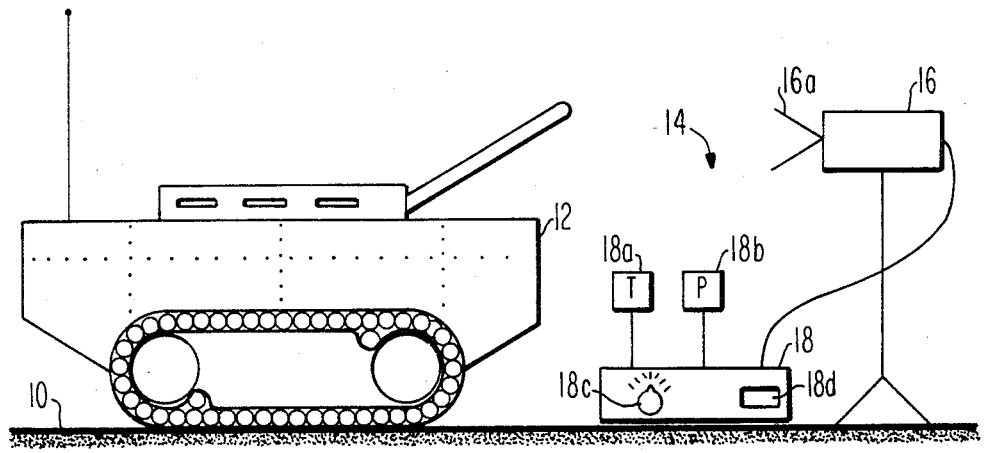
FIG. 1 illustrates the physical arrangement of the vehicle under test and a testing apparatus for performing the test method in accordance with a preferred embodiment of the present invention.

With respect to FIG. 1, 10 represents a level roadway upon which is positioned a vehicle 12, the power drive train of which to be tested. By way of example a military tank is illustrated but any other type of motorized vehicle could equally well be utilized including trucks, construction vehicles, automobiles, railroad locomotives, etc.

Opposite vehicle 12 is an automotive power train evaluation system 14. System 14 includes a speed measuring radar 16 having an antenna 16a directed toward vehicle 12 and an electronic data storage and calculation unit 18. Radar 16 may typically be a doppler shift radar of the kind used by police in speed enforcement modified in that the speed indicating signal which normally drives the display is the radar output.

Electronic system 18 typically includes a temperature sensing unit 18a, a barometric pressure sensing unit 18b, a multiposition switch (or push button switch) 18c permitting entry of the weight of vehicle 12 and a slot 18d for a ROM or other storage means containing a stored signal representing full acceleration speed versus time of a "standard" vehicle of the vehicle 12 type. A "standard" vehicle is one which has minimum acceptable speed versus time characteristics under full acceleration and which is of a given weight and in which the speed versus time data is taken at a given ambient pressure and temperature.

Figure 2:
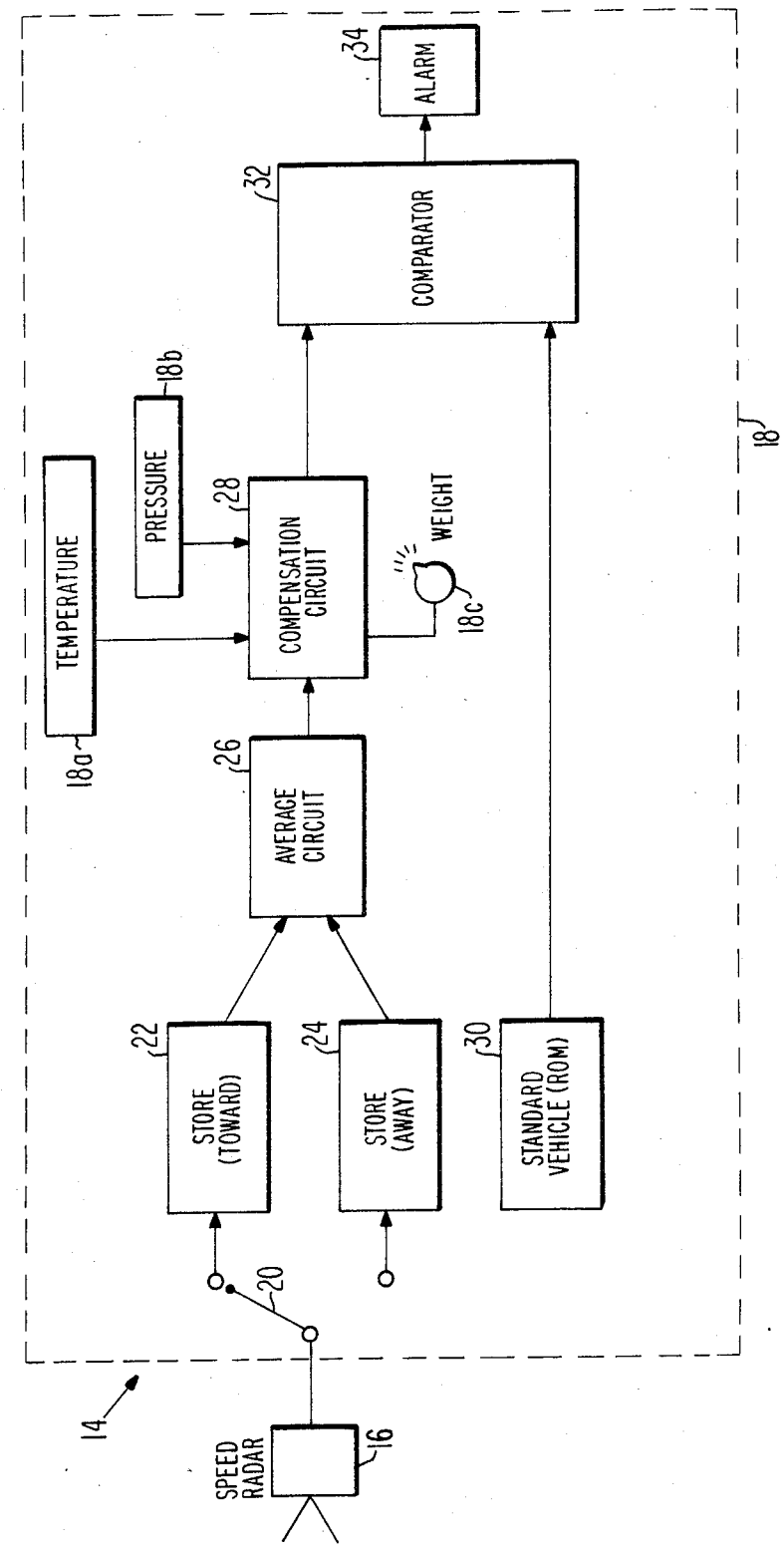
FIG. 2 is an automotive power train evaluation system in accordance with a preferred embodiment of the present invention in block diagram form.

System 14 is illustrated in more detail in FIG. 2 to which attention is now directed. In particular speed radar 16 is coupled by a two position switch 20 to two storage circuits 22 and 24 respectively. These storage devices which may be random access memories or magnetic tapes and tape drive circuitry, for example, store, in digital or analog fashion, a signal representing speed versus time of vehicle 12 (FIG. 1) as it is first driven toward radar 16 and then driven away from radar 16. Switch 20 is manually or automatically positioned between radar 16 and one or the other of the two storage devices.

Storage devices 22 and 24 are coupled to an averaging circuit 26 the purpose of which is to create an average speed versus time signal of vehicle 12 to cancel the effects of wind and any slight grade present on roadway 10. Average circuit 26 is coupled to a compensation circuit 28 to which is also coupled to temperature sensor 18a, pressure sensor 18b and switch 18c. The purpose of compensation ciruit 28 is to compensate the speed versus time signal produced by circuit 26 to take into account the effects of temperature, pressure and vehicle weight as they differ from the temperature, pressure and weight taken for the standard vehicle. The actual compensation may be empirically determined by trying out the standard vehicle under various temperature, pressure and weight conditions.

The read only memory or other storage device 30 which is normally plugged into slot 18d in electronics unit 18 of FIG. 1 contains information concerning the speed versus time of the aforementioned standard vehicle and will differ from one type vehicle 12 to a different type vehicle 12 and even within the same vehicles were different drive trains, types of transmissions, type of engines and so on are utilized. ROM 30 and the output of compensation circuit 28 are coupled to respective inputs of a comparator 32. The output of comparator 32 may be coupled to any type of display or alarm circuit 34. Comparator 32 compares the average speed versus time of a particular vehicle 12 as compensated by temperature, pressure and vehicle weight against the speed versus time characteristics of the standard vehicle. If the speed of the actual vehicle 12 at any instant in time falls below that of standard vehicle, vehicle 12 is in some way defective and this defect is enunciated by an alarm 34. The comparator 32 may be relatively unsophisticated simply giving a go or no go indication or may contain appropriate computing circuitry to determine a quantitative indication of deviation from normal in vehicle 12.

Figure 3:
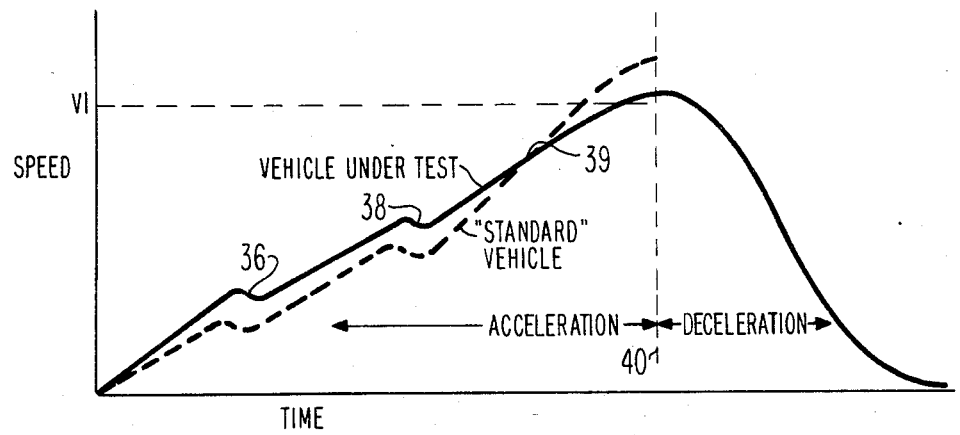
FIG. 3 is a waveform illustrating speed versus time of a vehicle under test and of a standard vehicle.

Referring now to FIG. 3, which shows an exemplary speed versus time waveform of vehicle 12, and of a standard vehicle like vehicle 12 it will be understood that the waveform results from vehicle 12 being driven at full acceleration toward or away from radar unit 16 up to some predetermined speed V1 indicated by a dashed line. That speed V1 is one in which vehicle 12 is accelerated through all its various gears up to its highest gear. The perturbations at points 36 and 38 in FIG. 3 are caused by transmission shifting in vehicle 12 and indicate a three speed transmission. Obviously, if there are more speeds in the transmission of a particular vehicle 12, there would be more perturbations such as 36 and 38. In FIG. 3 the vehicle under test fails because it loses power after point 39 such that after point 39 the standard vehicle is going at a faster speed.

Figure 4:
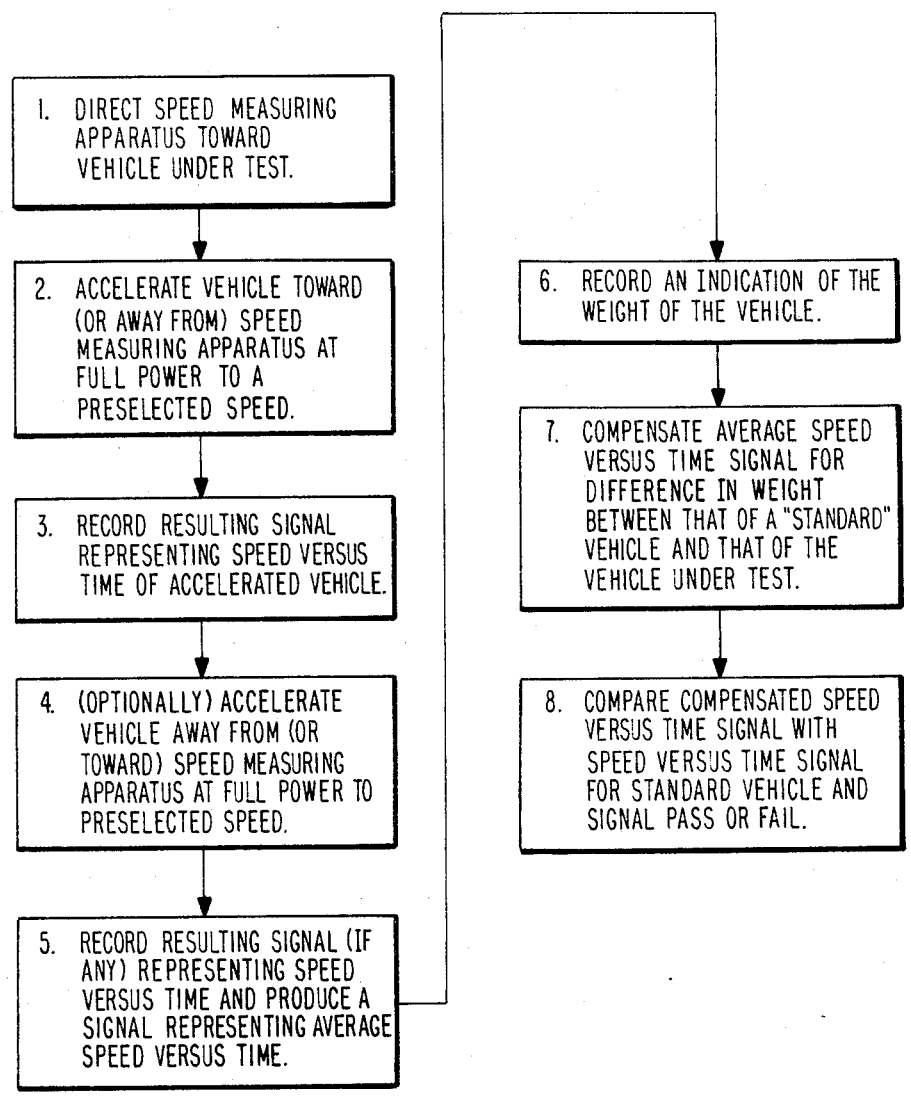
FIG. 4 is a list of sequential method steps utilized in carrying out the inventive method.

Operation of the automotive power train evaluation system will now be described in connection with the method steps listed in FIG. 4. With vehicle 12 located on a level roadway and its engine running such as to be warmed up when the test begins, radar 16 is positioned such that antenna 16a is directed toward vehicle 12. Next the vehicle is driven at full acceleration toward radar 16 until a preselected speed V1, FIG. 3, is reached and at which time the vehicle is stopped. The resulting speed versus time signal produced by radar 16 is stored in storage device 22, FIG. 2. The deceleration portion, that to the right dashed line 40, FIG. 3, may be optionally stored. It does not relate to the power train parts of the vehicle but is an indication of the vehicle's braking ability.

Switch 20, FIG. 2, is positioned such that radar 16 is connected to storage device 24 and vehicle 12 is turned around such as to be pointing away from radar 16. Then the vehicle is accelerated at full throttle away from radar 16 until a preselected speed of V1 is reached, at which time the vehicle is braked to a stop. Again the resulting signal from radar 16 representing speed verses time is stored in storage device 24. As was the case with acceleration toward and deceleration of vehicle 12 away from radar 16, the deceleration portion representing the braking action optionally may be stored in storage device 24. It will be understood that the step of driving vehicle 12 both toward and away from radar 16 is not absolutely necessary. It will be understood that the vehicle can be driven simply in one direction toward or away from radar 16 to get some indication of its speed verses time charactertistics. The advantage of driving both toward and away from radar 16 is that any prevailing wind or slight grade in roadway 10 will be compensated by the acceleration in both directions.

Assuming that runs toward and away from radar 16 are made, average circuit 26 averages the resulting signals stored in storage devices 22 and 24 to generate a signal representing average speed versus time at full acceleration of vehicle 12. Also, at some point in the test, switch 18c, FIGS. 1 and 2, is positioned to indicate the weight of vehicle 12 or preferably the weight added to an empty vehicle due to the weight of fuel, of the operator or operators where such are a significant fraction of the vehicle and other loads which are on the vehicle and are not on the standard vehicle.

At some point in the measurement process, a ROM or other means 30 of storing speed versus time data of a standard vehicle is plugged into slot 18d (FIG. 1) or otherwise connected to the apparatus 18 and more particularly comparator 32 thereof the average speed versus time signal or sole speed versus time signal if only one run is made by vehicle 12 is next compensated for temperature, pressure and weight differential between the weight of the standard vehicle and the weight of the actual vehicle 12 under test.

Thus by way of example the standard vehicle may weigh 6,000 pounds and the vehicle under test may weigh 7,000 pounds. Clearly in such a situation, other things being equal, the vehicle under test should accelerate more slowly than the standard vehicle. In such a situation compensation circuit 28 effectively time compresses the signal produced by average circuit 26. Similarly at a lower temperature than the temperature utilized in determining the speed versus time signal of a standard vehicle, the vehicle under test would operate at a faster acceleration, other things being equal, than does the standard vehicle. Compensation circuit 28 in that case would therefore, in effect, time expand the signal produced by average circuit 26. Finally, the compensated signal representing speed versus time of a vehicle 12 as normalized for weight, temperature and pressure is compared with speed versus time signal representing a standard vehicle as stored in storage device 30. The comparison takes place in a standard comparator 32 of conventional design. If the signal representing speed as produced by compensation circuit 28 is lower at any point in time than the signal representing speed of standard vehicle 30 then vehicle 12 is defective in some way and a signal is produced by comparing 32 causing alarm 34 to notify the mechanic operating the test.

It will be understood of course that comparator 32 can be as simple as that described or in fact it can have built into it a very sophisticated algorithm for making complex comparisons to thus lead to the determination of specifically what part of the vehicle is defective. For example with reference to waveform of FIG. 3 very pronounced dips at points 36 and/or 38 would tend to indicate that the defect was caused by a slipping transmission. If the total acceleration time, that is, the time from the vertical axis until speed V1 is reached is long in comparison with that of the standard vehicle, with no unusual dips at points 36 or 38, would indicate either that the engine was not producing adequate power or that some improper gear ratio was being used in vehicle 12. It is also conceiveable that a sophisticated comparator 32 could have fed into it, additional information about vehicle 12 determined from other sensors than those mentioned. For example, an indication of engine RPM could be inputted into compensation circuit 28. Such information could cause device 18 to differentiate between sluggish engine performance and an improper gear ratio in vehicle 12.

As indicated previously, storage devices 22 and 24 could store a portion of the waveform of FIG. 3 relating to deceleration of the vehicle. This could be utilized by comparator 32 to determine braking action. Unlike the situation with acceleration where it is desired that the speed versus time signal of the vehicle under test be above that of the standard vehicle, in deceleration it is desireable that the speed versus time signal be under that of a standard vehicle. Otherwise, improper breaking is indicated and that again could cause comparator 32 to produce an alarm indication by means of alarm 34.

What is claimed is:

1. A methed for testing a drive train of a self-propelled vehicle having a given weight utilizing a speed measuring radar directed toward said vehicle, comprising the steps of:

operating said vehicle at full acceleration in one of the directions toward or away from said speed measuring radar to a given speed;

recording the signal produced by said radar representing speed of said vehicle versus time;

recording a signal indicative of the difference in weight of said vehicle under test and the weight of a "standard" vehicle against which the vehicle under test is being compared;

compensating the signal representing speed versus time of the vehicle under test by said weight indicating signal; and comparing the compensated signal against a stored signal representing speed versus time of the said standard vehicle and producing a warning signal if the compensated signal differs from the standard signal representing the standard vehicle by a greater than a preselected amount.

2. The method of claim 1 including the further steps of:

propelling said vehicle at full acceleration in the other of the toward or away directions; and averaging the resulting signal from said radar with the recorded resulting signal to create the speed versus time signal to be compensated.

3. The method as set forth in claim 2 including the further step of measuring at least one weather related condition and compensating said average speed versus time signal in accordance with said weather related condition.

4. The method as set forth in claim 3 including measuring the temperature as said weather related condition.

5. The method as set forth in claim 3 including measuring the barometric pressure as said weather related condition.

* * * * *